United States Patent
Zhao et al.

(10) Patent No.: US 10,616,135 B2
(45) Date of Patent: Apr. 7, 2020

(54) RESOURCE USAGE CONTROL SYSTEM

(71) Applicant: Microsoft Technology Licensing, LLC, Redmond, WA (US)

(72) Inventors: Yang Zhao, Sunnyvale, CA (US); Yin Zhang, Sunnyvale, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 48 days.

(21) Appl. No.: 15/927,979

(22) Filed: Mar. 21, 2018

(65) Prior Publication Data

US 2019/0297028 A1    Sep. 26, 2019

(51) Int. Cl.
  *H04L 12/911* (2013.01)
  *H04L 29/08* (2006.01)
  *G06Q 30/02* (2012.01)

(52) U.S. Cl.
  CPC .......... *H04L 47/821* (2013.01); *G06Q 30/02* (2013.01); *H04L 47/823* (2013.01); *H04L 67/02* (2013.01); *H04L 67/22* (2013.01); *G06Q 30/0241* (2013.01); *G06Q 30/0243* (2013.01); *G06Q 30/0244* (2013.01); *G06Q 30/0251* (2013.01)

(58) Field of Classification Search
  CPC ......... H04L 67/02; H04L 67/22; G06Q 30/02; G06Q 30/0244; G06Q 30/0251; G06Q 30/0241; G06Q 30/0243
  See application file for complete search history.

(56) References Cited

U.S. PATENT DOCUMENTS

| | | | |
|---|---|---|---|
| 5,848,397 A | 12/1998 | Marsh et al. | |
| 7,136,871 B2* | 11/2006 | Ozer | G06Q 30/02 |
| 7,260,783 B1* | 8/2007 | Mika | G06Q 30/02 |
| | | | 715/738 |
| 7,734,503 B2* | 6/2010 | Agarwal | G06Q 30/02 |
| | | | 705/14.43 |
| 8,117,050 B2* | 2/2012 | Li | G06Q 10/025 |
| | | | 705/14.73 |
| 8,145,762 B2* | 3/2012 | Barber | G06Q 30/02 |
| | | | 709/226 |
| 8,260,663 B1* | 9/2012 | Ranka | G06Q 30/0244 |
| | | | 705/14.4 |

(Continued)

OTHER PUBLICATIONS

"Non Final Office Action Issued in U.S. Appl. No. 15/610,529", dated Apr. 9, 2019, 51 Pages.

(Continued)

*Primary Examiner* — Lashonda T Jacobs
(74) *Attorney, Agent, or Firm* — Hickman Palermo Becker Bingham LLP; Daniel D. Ledesma

(57) ABSTRACT

Techniques are provided for controlling resource usage in a computing environment. In response to receiving a content request, a set of candidate content delivery campaigns is identified. For a first candidate content delivery campaign in the set, an anticipated resource usage of a resource that is associated with the first candidate content delivery campaign is determined. The anticipated resource usage is determined based on (1) a resource reduction per event of each event in a set of detected events of a content item of the first candidate content delivery campaign and (2) a decay factor. Based on the anticipated resource usage, it is determined whether the first candidate content delivery campaign is to be removed from the set.

20 Claims, 7 Drawing Sheets

(56) References Cited

U.S. PATENT DOCUMENTS

| | | | |
|---|---|---|---|
| 8,402,482 B2* | 3/2013 | Woodward | G06Q 10/10 |
| | | | 705/14.1 |
| 8,863,298 B2* | 10/2014 | Akella | H04L 63/0815 |
| | | | 726/26 |
| 9,031,861 B1* | 5/2015 | Liu | G06Q 30/0205 |
| | | | 705/14.41 |
| 9,043,223 B1* | 5/2015 | Niu | G06Q 30/0242 |
| | | | 705/14.41 |
| 9,195,997 B2* | 11/2015 | Jevtic | G06Q 30/0243 |
| 9,767,489 B1* | 9/2017 | Liu | H04L 67/32 |
| 2010/0332322 A1* | 12/2010 | Porte | G06Q 10/0631 |
| | | | 705/14.49 |
| 2012/0130804 A1* | 5/2012 | Guo | G06Q 30/0247 |
| | | | 705/14.46 |
| 2012/0155380 A1* | 6/2012 | Hodges | G06Q 30/00 |
| | | | 370/328 |
| 2012/0253926 A1* | 10/2012 | Chen | G06Q 10/06 |
| | | | 705/14.49 |
| 2013/0132301 A1 | 5/2013 | Abreu | |
| 2015/0242907 A1 | 8/2015 | Wray | |
| 2015/0339728 A1* | 11/2015 | Sura | G06Q 30/0272 |
| | | | 705/14.73 |
| 2017/0147983 A1* | 5/2017 | Long | H04L 67/42 |
| 2017/0178253 A1* | 6/2017 | Koufogiannakis | G06Q 50/01 |
| 2017/0223137 A1* | 8/2017 | Yu | H04L 67/327 |
| 2018/0032583 A1* | 2/2018 | Koufogiannakis | G06F 16/951 |
| 2018/0034745 A1* | 2/2018 | Zhong | H04L 41/145 |

OTHER PUBLICATIONS

"Final Office Action Issued in U.S. Appl. No. 15/610,529", dated Dec. 23, 2019, 50 Pages.

* cited by examiner

RESOURCE USAGE CONTROL SYSTEM

TECHNICAL FIELD

The present disclosure relates to controlling resource usage in a computing environment. SUGGESTED CLASS/SUBCLASS: 709/235. SUGGESTED ART UNIT: 2447

BACKGROUND

The Internet has enabled the delivery of electronic content to billions of people. Some entities maintain content delivery exchanges that allow different content providers to reach a wide online audience. There is a limit to the resources that are dedicated to each content delivery campaign that a content provider establishes with a content delivery exchange. It is imperative that a content delivery exchange not exceed the resource limit of any content delivery campaign. However, this imperative is difficult to implement due to constant changes in the rate of user interaction with the content and the delay between when those interactions occur and when data reporting those interactions are received and processed by the content delivery exchange. For example, a content delivery exchange may experience a large amount of online traffic that triggers presentation of content items during different parts of the day while, during other parts of the day, the content delivery exchange may experience a relatively low amount of such online activity. As another example, while many different remote users may be presented with a content item (of a content delivery campaign) through their respective computing devices, a subset of those remote users might select the content item minutes or hours later. The delay between presentation and selection makes it difficult to adequate control resource usage of the content delivery campaign.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

A system and method for controlling the delivery of electronic content items over one or more computer networks are provided. In one approach, a throttling factor is calculated for a content item and dictates a probability that the content item will participate in a content item selection event. The throttling factor is determined based on current (actual) resource usage and anticipated resource usage that is based on how many instances of the content item have been served or presented to an end-user. Each instance of a content item being served or presented is associated with a decay factor that represents a likelihood that that instance will be selected by an end-user. The further in the past an instance is served or presented, the less likely the instance will be selected by an end-user. The throttling factor changes over time, depending on the current resource usage and the anticipated resource usage, both of which may be constantly updated.

System Overview

Figure 1:
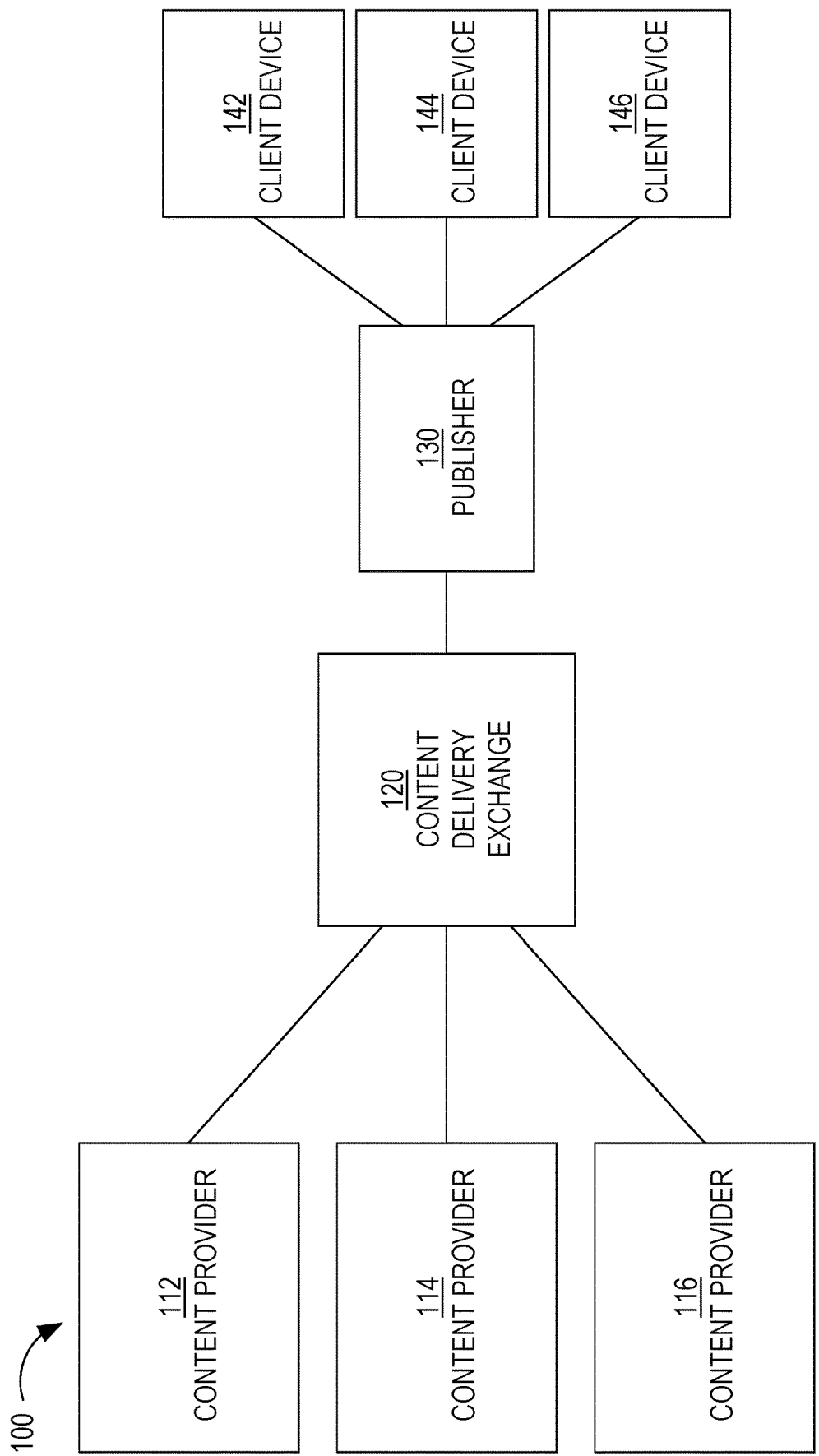
FIG. 1 is a block diagram that depicts a system for distributing content items to one or more end-users, in an embodiment.

FIG. 1 is a block diagram that depicts a system 100 for distributing content items to one or more end-users, in an embodiment. System 100 includes content providers 112-116, a content delivery exchange 120, a publisher 130, and client devices 142-146. Although three content providers are depicted, system 100 may include more or less content providers. Similarly, system 100 may include more than one publisher and more or less client devices.

Content providers 112-116 interact with content delivery exchange 120 (e.g., over a network, such as a LAN, WAN, or the Internet) to enable content items to be presented, through publisher 130, to end-users operating client devices 142-146. Thus, content providers 112-116 provide content items to content delivery exchange 120, which in turn selects content items to provide to publisher 130 for presentation to users of client devices 142-146. However, at the time that content provider 112 registers with content delivery exchange 120, neither party may know which end-users or client devices will receive content items from content provider 112.

An example of a content provider includes an advertiser. An advertiser of a product or service may be the same party as the party that makes or provides the product or service. Alternatively, an advertiser may contract with a producer or service provider to market or advertise a product or service provided by the producer/service provider. Another example of a content provider is an online ad network that contracts with multiple advertisers to provide content items (e.g., advertisements) to end users, either through publishers directly or indirectly through content delivery exchange 120.

Although depicted in a single element, content delivery exchange 120 may comprise multiple computing elements and devices, connected in a local network or distributed regionally or globally across many networks, such as the Internet. Thus, content delivery exchange 120 may comprise multiple computing elements, including file servers and database systems.

Publisher 130 provides its own content to client devices 142-146 in response to requests initiated by users of client devices 142-146. The content may be about any topic, such as news, sports, finance, and traveling. Publishers may vary greatly in size and influence, such as Fortune 500 companies, social network providers, and individual bloggers. A content request from a client device may be in the form of a HTTP request that includes a Uniform Resource Locator (URL) and may be issued from a web browser or a software application that is configured to only communicate with publisher 130 (and/or its affiliates). A content request may be a request that is immediately preceded by user input (e.g., selecting a hyperlink on web page) or may initiated as part of a subscription, such as through a Rich Site Summary (RSS) feed. In response to a request for content from a client device, publisher 130 provides the requested content (e.g., a web page) to the client device.

Simultaneously or immediately before or after the requested content is sent to a client device, a content request is sent to content delivery exchange 120. That request is sent (over a network, such as a LAN, WAN, or the Internet) by publisher 130 or by the client device that requested the original content from publisher 130. For example, a web page that the client device renders includes one or more calls (or HTTP requests) to content delivery exchange 120 for one or more content items. In response, content delivery exchange 120 provides (over a network, such as a LAN, WAN, or the Internet) one or more particular content items to the client device directly or through publisher 130. In this way, the one or more particular content items may be presented (e.g., displayed) concurrently with the content requested by the client device from publisher 130.

In response to receiving a content request, content delivery exchange 120 initiates a content item selection event that involves selecting one or more content items (from among multiple content items) to present to the client device that initiated the content request. An example of a content item selection event is an auction.

Content delivery exchange 120 and publisher 130 may be owned and operated by the same entity or party. Alternatively, content delivery exchange 120 and publisher 130 are owned and operated by different entities or parties.

A content item may comprise an image, a video, audio, text, graphics, virtual reality, or any combination thereof. A content item may also include a link (or URL) such that, when a user selects (e.g., with a finger on a touchscreen or with a cursor of a mouse device) the content item, a (e.g., HTTP) request is sent over a network (e.g., the Internet) to a destination indicated by the link. In response, content of a web page corresponding to the link may be displayed on the user's client device.

Examples of client devices 142-146 include desktop computers, laptop computers, tablet computers, wearable devices, video game consoles, and smartphones.

Bidders

In a related embodiment, system 100 also includes one or more bidders (not depicted). A bidder is a party that is different than a content provider, that interacts with content delivery exchange 120, and that bids for space (on one or more publishers, such as publisher 130) to present content items on behalf of multiple content providers. Thus, a bidder is another source of content items that content delivery exchange 120 may select for presentation through publisher 130. Thus, a bidder acts as a content provider to content delivery exchange 120 or publisher 130. Examples of bidders include AppNexus, DoubleClick, and LinkedIn. Because bidders act on behalf of content providers (e.g., advertisers), bidders create content delivery campaigns and, thus, specify user targeting criteria and, optionally, frequency cap rules, similar to a traditional content provider.

In a related embodiment, system 100 includes one or more bidders but no content providers. However, embodiments described herein are applicable to any of the above-described system arrangements.

Content Delivery Campaigns

Each content provider establishes a content delivery campaign with content delivery exchange 120. A content delivery campaign includes (or is associated with) one or more content items. Thus, the same content item may be presented to users of client devices 142-146. Alternatively, a content delivery campaign may be designed such that the same user is (or different users are) presented different content items from the same campaign. For example, the content items of a content delivery campaign may have a specific order, such that one content item is not presented to a user before another content item is presented to that user.

A content delivery campaign is an organized way to present information to users that qualify for the campaign. Different content providers have different purposes in establishing a content delivery campaign. Example purposes include having users view a particular video or web page, fill out a form with personal information, purchase a product or service, make a donation to a charitable organization, volunteer time at an organization, or become aware of an enterprise or initiative, whether commercial, charitable, or political.

A content delivery campaign has a start date/time and, optionally, a defined end date/time. For example, a content delivery campaign may be to present a set of content items from Jun. 1, 2015 to Aug. 1, 2015, regardless of the number of times the set of content items are presented ("impressions"), the number of user selections of the content items (e.g., click throughs), or the number of conversions that resulted from the content delivery campaign. Thus, in this example, there is a definite (or "hard") end date. As another example, a content delivery campaign may have a "soft" end date, where the content delivery campaign ends when the corresponding set of content items are displayed a certain number of times, when a certain number of users view the set of content items, select or click on the set of content items, or when a certain number of users purchase a product/service associated with the content delivery campaign or fill out a particular form on a website.

A content delivery campaign may specify one or more targeting criteria that are used to determine whether to present a content item of the content delivery campaign to one or more users. Example factors include date of presentation, time of day of presentation, characteristics of a user to which the content item will be presented, attributes of a computing device that will present the content item, identity of the publisher, etc. Examples of characteristics of a user include demographic information, geographic information (e.g., of an employer), job title, employment status, academic degrees earned, academic institutions attended, former employers, current employer, number of connections in a social network, number and type of skills, number of endorsements, and stated interests. Examples of attributes of a computing device include type of device (e.g., smartphone, tablet, desktop, laptop), geographical location, operating system type and version, size of screen, etc.

For example, targeting criteria of a particular content delivery campaign may indicate that a content item is to be presented to users with at least one undergraduate degree, who are unemployed, who are accessing from South America, and where the request for content items is initiated by a smartphone of the user. If content delivery exchange 120 receives, from a computing device, a request that does not satisfy the targeting criteria, then content delivery exchange 120 ensures that any content items associated with the particular content delivery campaign are not sent to the computing device.

Thus, content delivery exchange 120 is responsible for selecting a content delivery campaign in response to a request from a remote computing device by comparing (1) targeting data associated with the computing device and/or a user of the computing device with (2) targeting criteria of one or more content delivery campaigns. Multiple content delivery campaigns may be identified in response to the request as being relevant to the user of the computing device. Content delivery exchange 124 may select a strict subset of the identified content delivery campaigns from which content items will be identified and presented to the user of the computing device.

Instead of one set of targeting criteria, a single content delivery campaign may be associated with multiple sets of targeting criteria. For example, one set of targeting criteria may be used during one period of time of the content delivery campaign and another set of targeting criteria may be used during another period of time of the campaign. As another example, a content delivery campaign may be associated with multiple content items, one of which may be associated with one set of targeting criteria and another one of which is associated with a different set of targeting criteria. Thus, while one content request from publisher 130 may not satisfy targeting criteria of one content item of a campaign, the same content request may satisfy targeting criteria of another content item of the campaign.

Different content delivery campaigns that content delivery exchange 120 manages may have different charge models. For example, content delivery exchange 120 may charge a content provider of one content delivery campaign for each presentation of a content item from the content delivery campaign (referred to herein as cost per impression or CPM). Content delivery exchange 120 may charge a content provider of another content delivery campaign for each time a user interacts with a content item from the content delivery campaign, such as selecting or clicking on the content item (referred to herein as cost per click or CPC). Content delivery exchange 120 may charge a content provider of another content delivery campaign for each time a user performs a particular action, such as purchasing a product or service, downloading a software application, or filling out a form (referred to herein as cost per action or CPA). Content delivery exchange 120 may manage only campaigns that are of the same type of charging model or may manage campaigns that are of any combination of the three types of charging models.

A content delivery campaign may be associated with a resource budget that indicates how much the corresponding content provider is willing to be charged by content delivery exchange 120, such as $100 or $5,200. A content delivery campaign may also be associated with a bid amount that indicates how much the corresponding content provider is willing to be charged for each impression, click, or other action. For example, a CPM campaign may bid five cents for an impression, a CPC campaign may bid five dollars for a click, and a CPA campaign may bid five hundred dollars for a conversion (e.g., a purchase of a product or service).

Content Item Selection Events

As mentioned previously, a content item selection event is when multiple content items (e.g., from different content delivery campaigns) are considered and a subset selected for presentation on a computing device in response to a request. Thus, each content request that content delivery exchange 120 receives triggers a content item selection event.

For example, in response to receiving a content request, content delivery exchange 120 analyzes multiple content delivery campaigns to determine whether attributes associated with the content request (e.g., attributes of a user that initiated the content request, attributes of a computing device operated by the user, current date/time) satisfy targeting criteria associated with each of the analyzed content delivery campaigns. If so, the content delivery campaign is considered a candidate content delivery campaign. One or more filtering criteria may be applied to a set of candidate content delivery campaigns to reduce the total number of candidates.

As another example, users are assigned to content delivery campaigns (or specific content items within campaigns) "off-line"; that is, before content delivery exchange 120 receives a content request that is initiated by the user. For example, when a content delivery campaign is created based on input from a content provider, one or more computing components may compare the targeting criteria of the content delivery campaign with attributes of many users to determine which users are to be targeted by the content delivery campaign. If a user's attributes satisfy the targeting criteria of the content delivery campaign, then the user is assigned to a target audience of the content delivery campaign. Thus, an association between the user and the content delivery campaign is made. Later, when a content request that is initiated by the user is received, all the content delivery campaigns that are associated with the user may be quickly identified, in order to avoid real-time (or on-the-fly) processing of the targeting criteria. Some of the identified campaigns may be further filtered based on, for example, the campaign being deactivated or terminated, the device that the user is operating being of a different type (e.g., desktop) than the type of device targeted by the campaign (e.g., mobile device).

A final set of candidate content delivery campaigns is ranked based on one or more criteria, such as predicted click-through rate (which may be relevant only for CPC campaigns), effective cost per impression (which may be relevant to CPC, CPM, and CPA campaigns), and/or bid price. Each content delivery campaign may be associated with a bid price that represents how much the corresponding content provider is willing to pay (e.g., content delivery exchange 120) for having a content item of the campaign presented to an end-user or selected by an end-user. Different content delivery campaigns may have different bid prices. Generally, content delivery campaigns associated with relatively higher bid prices will be selected for displaying their respective content items relative to content items of content delivery campaigns associated with relatively lower bid prices. Other factors may limit the effect of bid prices, such as objective measures of quality of the content items (e.g., actual click-through rate (CTR) and/or predicted CTR of each content item), budget pacing (which controls how fast a campaign's budget is used and, thus, may limit a content item from being displayed at certain times), frequency capping (which limits how often a content item is presented to the same person), and a domain of a URL that a content item might include.

An example of a content item selection event is an advertisement auction, or simply an "ad auction."

In one embodiment, content delivery exchange 120 conducts one or more content item selection events. Thus, content delivery exchange 120 has access to all data associated with making a decision of which content item(s) to select, including bid price of each campaign in the final set of content delivery campaigns, an identity of an end-user to which the selected content item(s) will be presented, an indication of whether a content item from each campaign was presented to the end-user, a predicted CTR of each campaign, a CPC or CPM of each campaign.

In another embodiment, an exchange that is owned and operated by an entity that is different than the entity that owns and operates content delivery exchange 120 conducts one or more content item selection events. In this latter embodiment, content delivery exchange 120 sends one or more content items to the other exchange, which selects one or more content items from among multiple content items that the other exchange receives from multiple sources. In this embodiment, content delivery exchange 120 does not necessarily know (a) which content item was selected if the selected content item was from a different source than content delivery exchange 120 or (b) the bid prices of each content item that was part of the content item selection event. Thus, the other exchange may provide, to content delivery exchange 120, information regarding one or more bid prices and, optionally, other information associated with the content item(s) that was/were selected during a content item selection event, information such as the minimum winning bid or the highest bid of the content item that was not selected during the content item selection event.

Tracking User Interactions

Content delivery exchange 120 tracks one or more types of user interactions across client devices 142-146 (and other client devices not depicted). For example, content delivery exchange 120 determines whether a content item that content delivery exchange 120 delivers is presented at (e.g., displayed by or played back at) a client device. Such a "user interaction" is referred to as an "impression." As another example, content delivery exchange 120 determines whether a content item that exchange 120 delivers is selected by a user of a client device. Such a "user interaction" is referred to as a "click." Content delivery exchange 120 stores such data as user interaction data, such as an impression data set and/or a click data set.

For example, content delivery exchange 120 receives impression data items, each of which is associated with a different instance of an impression and a particular content delivery campaign. An impression data item may indicate a particular content delivery campaign, a specific content item, a date of the impression, a time of the impression, a particular publisher or source (e.g., onsite v. offsite), a particular client device that displayed the specific content item, and/or a user identifier of a user that operates the particular client device. Thus, if content delivery exchange 120 manages multiple content delivery campaigns, then different impression data items may be associated with different content delivery campaigns. One or more of these individual data items may be encrypted to protect privacy of the end-user.

Similarly, a click data item may indicate a particular content delivery campaign, a specific content item, a date of the user selection, a time of the user selection, a particular publisher or source (e.g., onsite v. offsite), a particular client device that displayed the specific content item, and/or a user identifier of a user that operates the particular client device. If impression data items are generated and processed properly, a click data item should be associated with an impression data item that corresponds to the click data item.

Process Overview

Figure 2:
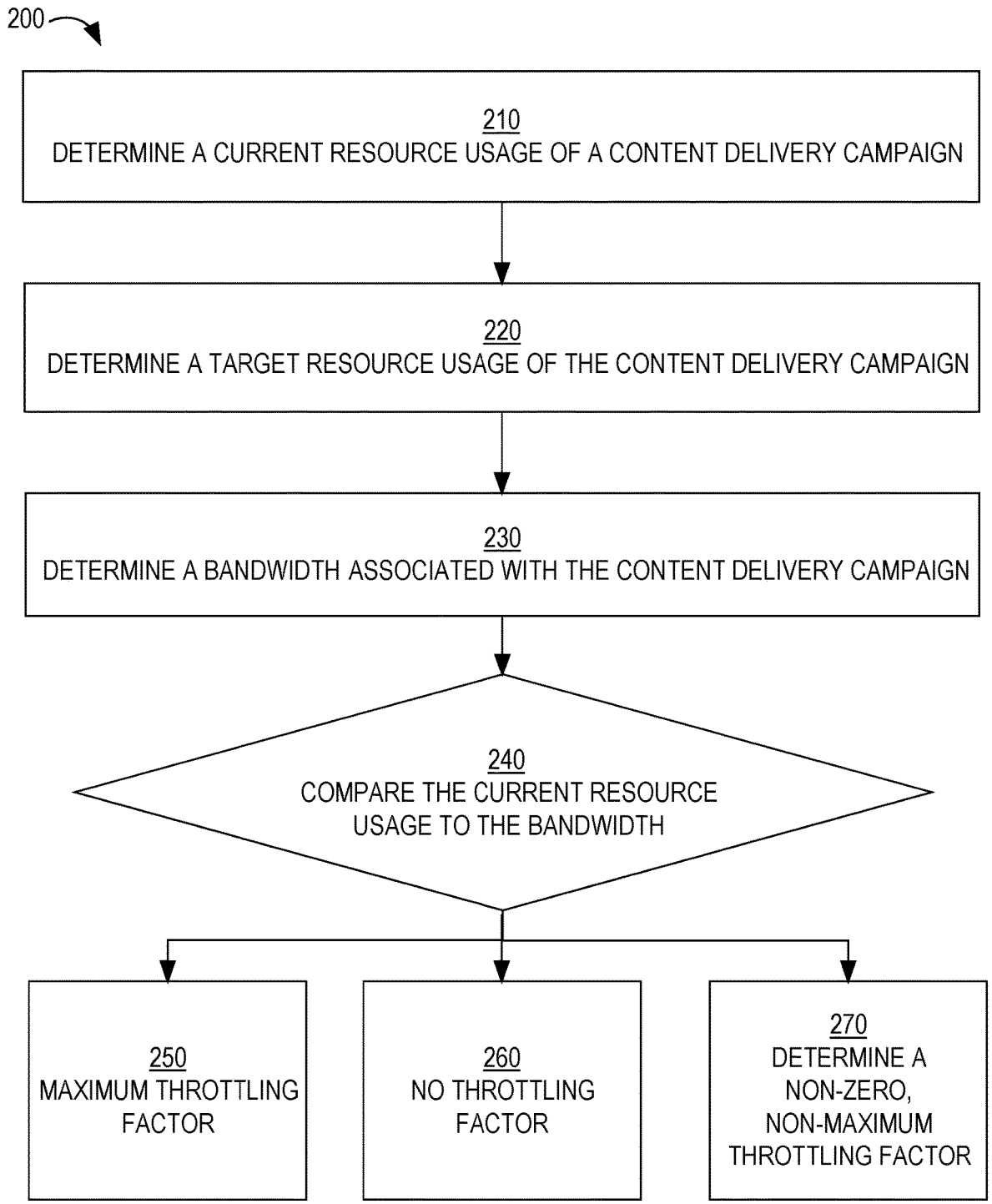
FIG. 2 is a flow diagram that depicts a process for controlling resource usage associated with a content delivery campaign, in an embodiment.

FIG. 2 is a flow diagram that depicts a process 200 for controlling the resource usage associated with a particular content delivery campaign, in an embodiment. Process 200 may be implemented by content delivery exchange 120. Process 200 may be performed in response to a content request that initiates a content item selection event. For example, process 200 may be performed for multiple content delivery campaigns that are candidates for a single content item selection event. Alternatively, process 200 may be performed offline; that is, not in response to a content request but in anticipation of a content request. For example, process 200 may occur every ten minutes for a set of (e.g., all active) content delivery campaigns.

At block 210, a current resource usage of a content delivery campaign is determined. "Resource usage" may refer to a number of impressions that have occurred, a number of clicks that have occurred, a number of another type of action that has occurred, or an amount of money that a content provider must compensate content delivery exchange 120 for delivering content items associated with one or more content delivery campaigns initiated by the content provider. For example, 10% of a daily budget associated with a content delivery campaign has been used up until a time when block 210 is performed.

Current resource usage is usage of a resource for a particular period of time ending at the present time. Current resource usage may be an estimate based on current statistics (e.g., based on user interaction data items, such as impression data items or click data items) or may reflect only the user interaction data items and, as a result, may be old or stale, i.e., reflecting a period of time that excludes a most recent period of time, such as the most recent two minutes, due to the speed (or lack thereof) in which user interaction data items are collected and processed by content delivery exchange 120. However, the staleness (or most recent period of time) may be small enough that the actual resource usage (reflected in the current state of the user interaction data) is sufficient for pacing purposes.

In an embodiment, multiple content delivery campaigns share a single budget. Therefore, block 210 may involve determining a current resource usage of a set of campaigns, even though process 200 might be performed for a content item selection event that involves only one content delivery campaign in the set.

Block 210 may involve determining how many clicks have occurred (if the content delivery campaign is a CPC campaign) during a period of time, how many impressions have occurred (if the content delivery campaign is a CPM campaign) during the period of time, or how many of a particular type of action has occurred during that period of time. Additionally, block 210 may involve determining what the minimum winning bid was for each content item selection event in which the impression/click/action occurred, since different content item selection events may be associated with different minimum winning bids. The higher the minimum winning bids, the higher the current resource usage (all else being equal). Conversely, the lower the minimum winning bids, the lower the current resource usage.

At block 220, a target resource usage of the content delivery campaign is determined. The target resource usage reflects an amount of resource that is planned to be used by a particular point in time, such as a particular time within a usage cycle (e.g., a day) or within the life of the content delivery campaign. Typically, as the time within a usage cycle passes or the "life" of the content delivery campaign passes, the target resource usage increases. The target resource usage of a content delivery campaign may be represented by a straight line (i.e., with a constant slope) on a graph where the x-axis is time. Alternatively, the target resource usage may be represented by a line with varying slope. For example, the slope may decrease over one time period in a usage cycle and may increase over another time period in the usage cycle.

Thus, at time 1, the target resource usage of a content delivery campaign is A and at time 2 (which is later than time 1), the target resource usage of the content delivery campaign may be B, which is greater than A.

Further, if the life of a content delivery campaign is divided into multiple time periods (e.g., different days), where each time period is associated with a fresh/zero/reset current resource usage, different time periods may be associated with different target resource usage lines. For example, target resource usage on day 1 may be uniform (i.e., a straight line) and target resource usage on day 2 may start out relatively low and then increase dramatically at the end of the day. As another example, the target resource usage on a weekend day may be different than the target resource usage on a weekday.

Target resource usage for a content delivery campaign may be based on past performance (i.e., actual resource usage) of the content delivery campaign, past performance of other content delivery campaigns from the same content provider, and/or past performance of similar content delivery campaigns (e.g., that target a similar audience or that pertain to a certain type of industry, product, or service). Thus, different content delivery campaigns may be associated with different target resource usages.

At block 230, a bandwidth around the target resource usage is determined. The bandwidth is a distance between an upper bound (which is greater than the target resource usage) and a lower bound (which is lesser than the target resource usage). The greater the bandwidth, the greater the current resource usage can fluctuate.

At block 240, the current resource usage is compared to the bandwidth. The result of block 240 is one of three options, each of which corresponds to one of blocks 250-270.

If the current resource usage is greater than the upper bound, then process 200 proceeds to block 250.

At block 250, the content delivery campaign is prevented from participating in one or more content item selection events (including the content item selection event that, in an embodiment, is triggered process 200), even if the targeting criteria of the content delivery campaign perfectly matches targeting data associated with a content request that content delivery exchange 120 receives and even if a bid and/or predicted click-through rate (pCTR) associated with the content delivery campaign is/are higher than any other the bid/pCTR of every other candidate content delivery campaign. Block 250 may be considered as establishing a maximum throttling factor (e.g., 1), which indicates that the content delivery campaign should not participate in any content item selection event until (at a later time) the current resource usage becomes closer than the target resource usage (determined at that later time).

If the current resource usage is less than the lower bound, then process 200 proceeds to block 260.

At block 260, the content delivery campaign is allowed to participate in one or more content item selection events (including the content item selection event that, in an embodiment, is triggered process 200). In block 260, there is no throttling factor, which indicates that it is desired that the content delivery campaign participate in as many content item selection events as possible, at least because the current resource usage is below the target resource usage by a particular amount.

If the current resource usage is between the upper bound and the lower bound, then process 200 proceeds to block 270.

At block 270, a throttling factor is determined that represents a likelihood that the content delivery campaign will participate in one or more content item selection events (including the content item selection event that, in an embodiment, is triggered process 200). The throttling factor is a non-zero, non-maximum throttling factor. The closer the current resource usage is to the upper bound of the bandwidth, the higher the throttling factor (i.e., the lower the likelihood of participating in a content item selection event). Conversely, the closer the current resource usage is to the lower bound of the bandwidth, the lower the throttling factor (i.e., the higher the likelihood of participating in a content item selection event).

Bandwidth

A bandwidth may be calculated in one of many ways. In an embodiment, a bandwidth is a constant width or difference throughout a usage cycle or throughout a life of content delivery campaign. For example, an upper bound may always be 10% greater than a target resource usage at any given time and a lower bound may always be 10% lower than the target resource usage at any given time. As another example, an upper bound may always be 12% greater than a target resource usage at any given time and a lower bound may always be 5% lower than the target resource usage at any given time.

In an alternative embodiment, a bandwidth varies with time. For example, at time 1, the bandwidth may be 10% around the target resource usage and, at time 2, the bandwidth may be 15% around the target resource usage.

In a related embodiment, different content delivery campaigns are associated with different bandwidths. For example, the greater the total budget or budget of a usage cycle, the greater the bandwidth.

A bandwidth that is too small will result in an unstable throttling parameter, while a bandwidth that is too large can lead to unnecessarily large tracking errors. In an embodiment, CPM campaigns are associated with bandwidths that are narrower or smaller than the bandwidths associated with CPC campaigns, which may only experience a few clicks per usage cycle (e.g., a single day).

In an embodiment, a bandwidth is based on a content delivery campaign's bid value. For example, the greater the bid value, the greater the bandwidth. As a specific example of a general rule, a bandwidth of a campaign may be three times the bid value of the campaign. A rationale for choosing a bandwidth is to keep the bandwidth as small as possible while maintaining a stable algorithm. In order to maintain a stable algorithm, a bandwidth should be as big as a resource usage event. For CPM campaigns, a resource usage event is an impression and the resource usage is roughly equivalent to the corresponding bid value. For CPC campaigns, a resource usage event is a click (or user selection) and (again) the resource usage is roughly equivalent to the corresponding bid value. (If content item selection events are considered second price auctions, then the resource usage for a single resource usage event is likely to be lower than the corresponding bid value.)

In a related embodiment, a bandwidth is calculated based on a campaign's bid and budget. The ratio between a bid and a budget corresponds to the amount a single impression or click will change the actual (current) resource usage. The following table illustrates some examples of a bandwidth as a function of the bid and budget:

| campaign | bid/budget | % daily budget spent by a single action | bandwidth |
| --- | --- | --- | --- |
| CPM: $.005 per bid. $100 budget | .00005 | .005% | .5% |
| CPC: $10 per bid. $100 budget | .1 | 10% | 10% |
| CPC: $20 per bid. $40 budget | .5 | 50% | 20% |
| CPC: $10 per bid. $1000 budget | .01 | 1% | 1% |

In an embodiment, a maximum bandwidth and/or a minimum bandwidth are established, even if the ratio of a bid/budget dictates a bandwidth that is greater than the maximum bandwidth or lesser than the minimum bandwidth. The first row in the above table shows that a minimum bandwidth (i.e., 0.5%) has been used instead of what the corresponding bid/budget ratio suggests (i.e., 0.005%). Likewise, the second row in the above table shows that a maximum bandwidth (i.e., 20%) has been used instead of what the corresponding bid/budget ratio suggests (i.e., 50%).

The maximum bandwidth and/or the minimum bandwidth may be global, in that they are applicable to all (or most) content delivery campaigns, even campaigns established by different content providers. Alternatively, a maximum/minimum bandwidth may be established on a per-content provider basis or a per-campaign basis.

Offset

In an embodiment, an offset is defined that indicates where the bandwidth begins (or ends). For example, the offset dictates how much below the target resource usage the lower bound of a bandwidth is located or how much above the target resource usage the upper bound of the bandwidth is located. For example, a bandwidth may be 10% and an offset may be 7%, meaning that the lower bound is 7% below the target resource usage and the upper bound is 3% above the target resource usage.

In an embodiment, an offset varies over time. For example, the offset is greatest at the beginning of a usage cycle and approaches 0 or becomes 0 towards the end of the usage cycle. An offset at one point in a usage cycle may be such that the upper bound of a bandwidth is at or below a target resource usage. Such a scenario may be useful if it is desired that a content delivery campaign has a "slow start" and, as the usage cycle approaches the end, the offset decreases (if the offset defines the lower bound of the bandwidth), causing the content delivery campaign to have a "fast finish" (due to the upper bound curve increasing faster than the target resource usage curve) meaning the slope of a resulting current resource usage curve is more likely to increase such that the current resource usage curve approaches or surpasses the target resource usage curve.

Figure 3:
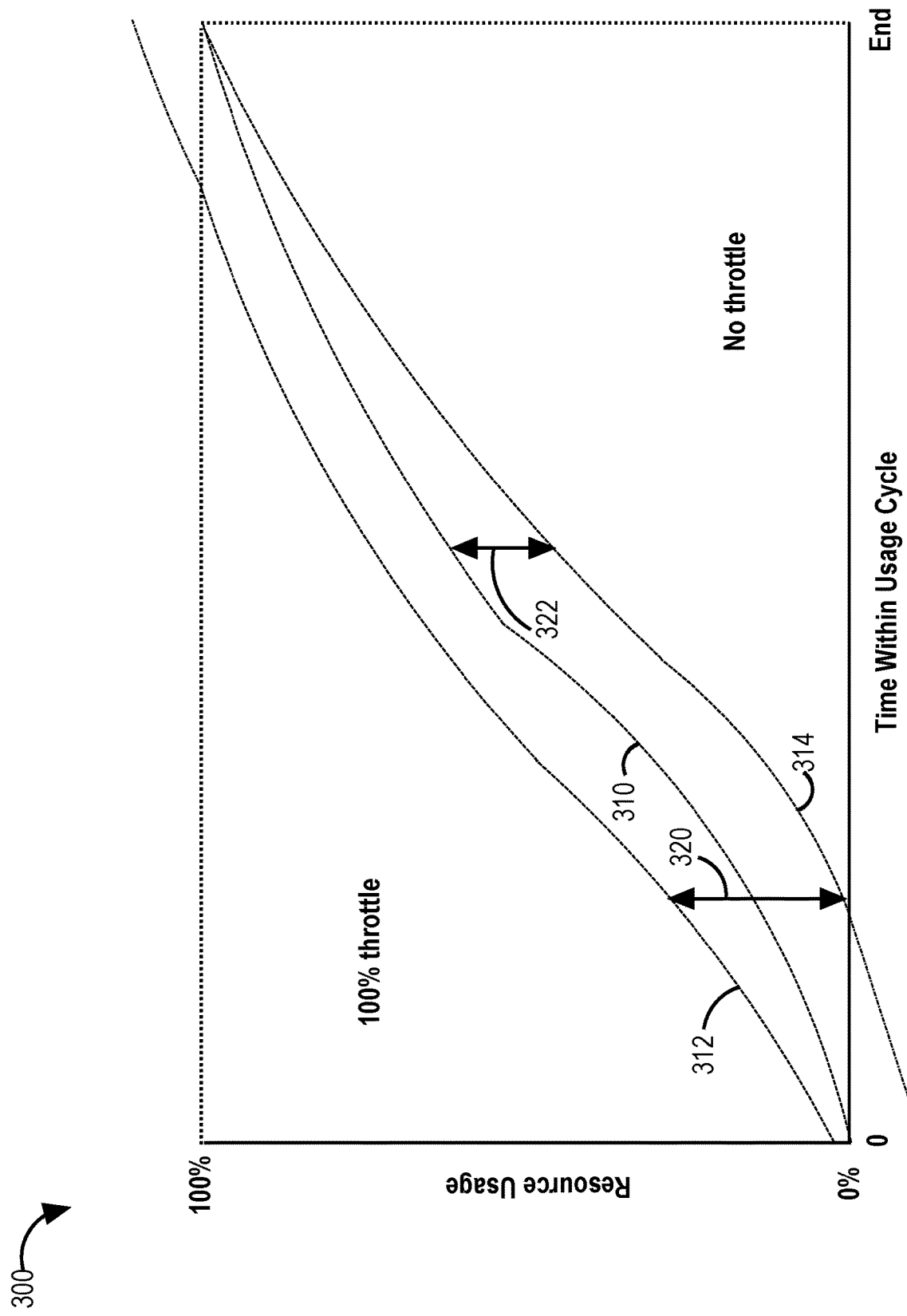
FIG. 3 is a chart that depicts a bandwidth and an offset relative to a target resource usage curve, in an embodiment.

FIG. 3 is a chart 300 that depicts a target resource usage curve 310, an upper bound curve 312, a lower bound curve 314, a bandwidth 320, and an offset 322, in an embodiment. The x-axis corresponds to time (ranging from time 0 to the end of a usage cycle) and the y-axis corresponds to resource usage (ranging from 0 resource usage to full or 100% resource usage). Bandwidth 320 is defined as the space between a point on upper bound curve 312 at time T and a point on lower bound curve 314 at time T. Offset 322 is defined as the space between a point on target resource usage curve 310 at time T and a point on lower bound curve 314 at time T. (In other implementations, offset 322 may be defined as the space between a point on target resource usage curve 310 at time T and a point on upper bound curve 312 at time T.

As indicated in the example of chart 300, the bandwidth and the offset change over time. Also, chart 300 indicates that if current resource usage at a particular time is above upper bound curve 312, then the throttling factor is to be 100%, indicating that the corresponding content delivery campaign will not participate in one or more content item selection events. Conversely, if current resource usage at a particular time is below lower bound curve 314, then the throttling factor is to be 0%, indicating that the corresponding content delivery campaign will not be prevented from participating in one or more content item selection events based on the throttling factor.

Chart 300 also indicates that, based on the portion of upper bound curve 312 that extends beyond 100% resource usage, greater than 100% resource usage is acceptable. Also, the portion of lower bound curve 314 that extends below 0% resource usage indicates that there will be some throttling initially, forcing the content delivery campaign to have a "slow start."

Different content delivery campaigns may have different offsets. The different offsets may be based on the type of charging model (e.g., CPM v. CPC) of the content delivery campaign. For example, CPM campaigns may generally have lower offsets than CPC campaigns at the beginning of a usage cycle, but may generally have higher offsets than CPC campaigns at the end of the usage cycle. As another example, CPC campaigns may generally have stable (e.g., unchanging) offsets (e.g., 5% below the target resource usage curve) while CPM campaigns may generally have varying offsets (e.g., 10% below the target resource usage at the beginning of a usage cycle and 0% below the target resource usage at the end of the usage cycle).

In an embodiment, an offset for a single content delivery campaign may vary across usage cycles. For example, on the beginning of usage cycle 1 (e.g., day 1), the offset begins at 10% below the target resource usage and on the beginning of usage cycle 2 (e.g., day 2), the offset begins at 5% below the target resource usage.

In an embodiment where no offset is established for a content delivery campaign, the target resource usage curve represents the center of the bandwidth. Thus, if the bandwidth is known, then the upper and lower bounds of the bandwidth can be easily determined/calculated.

Interpolation

As described previously, if a current resource usage is at or above the upper bound of a bandwidth, then a throttling factor is set to be a maximum value (e.g., 1.0), indicating that the corresponding content delivery campaign will not participate in a content item selection event. If the current resource usage is at or below the lower bound of the bandwidth, then the throttling factor is set to be a minimum value (e.g., 0), indicating that the corresponding content delivery campaign will not be prevented from participating in a content item selection event, at least based on the throttling factor. (Other factors may keep the content delivery campaign from participating in a content item selection event, such as a bid price and/or a predicted click-through rate, which may be lower relative to other content delivery campaigns.)

If it is determined that the current resource usage is within the bandwidth of a target resource usage at a particular time, then the throttling factor is set to be a value between the maximum value and the minimum value. The throttling factor may be determined using interpolation, such as linear interpolation.

For example, the upper and lower bounds of a bandwidth at time T are determined. A first difference between the current resource usage at time T ($C_T$) and the lower abound ($LB_T$) is determined (e.g., $C_T$-$LB_T$). Also, a second difference between the upper bound ($UB_T$) at time T and $LB_T$ is determined (e.g., $UB_T$-$LB_T$). A ratio between the first difference and the second difference is calculated (e.g., ($C_T$-$LB_T$)/($UB_T$-$LB_T$)) and can be used as the throttling factor.

For example, if the bandwidth defines a range of values and current resource usage is exactly in the middle of the range (i.e., between the upper bound and the lower bound of the bandwidth, then the throttling factor is 50% of the maximum throttling value (e.g., 0.5). If the current resource usage is ¼ of the way from the minimum value in the range of values, then the throttling factor is 25% of the maximum throttling value (e.g., 0.25). If the current resource usage is 1/20 of the way from the minimum value in the range of values, then the throttling factor is 5% of the maximum throttling value (e.g., 0.05).

Figure 4:
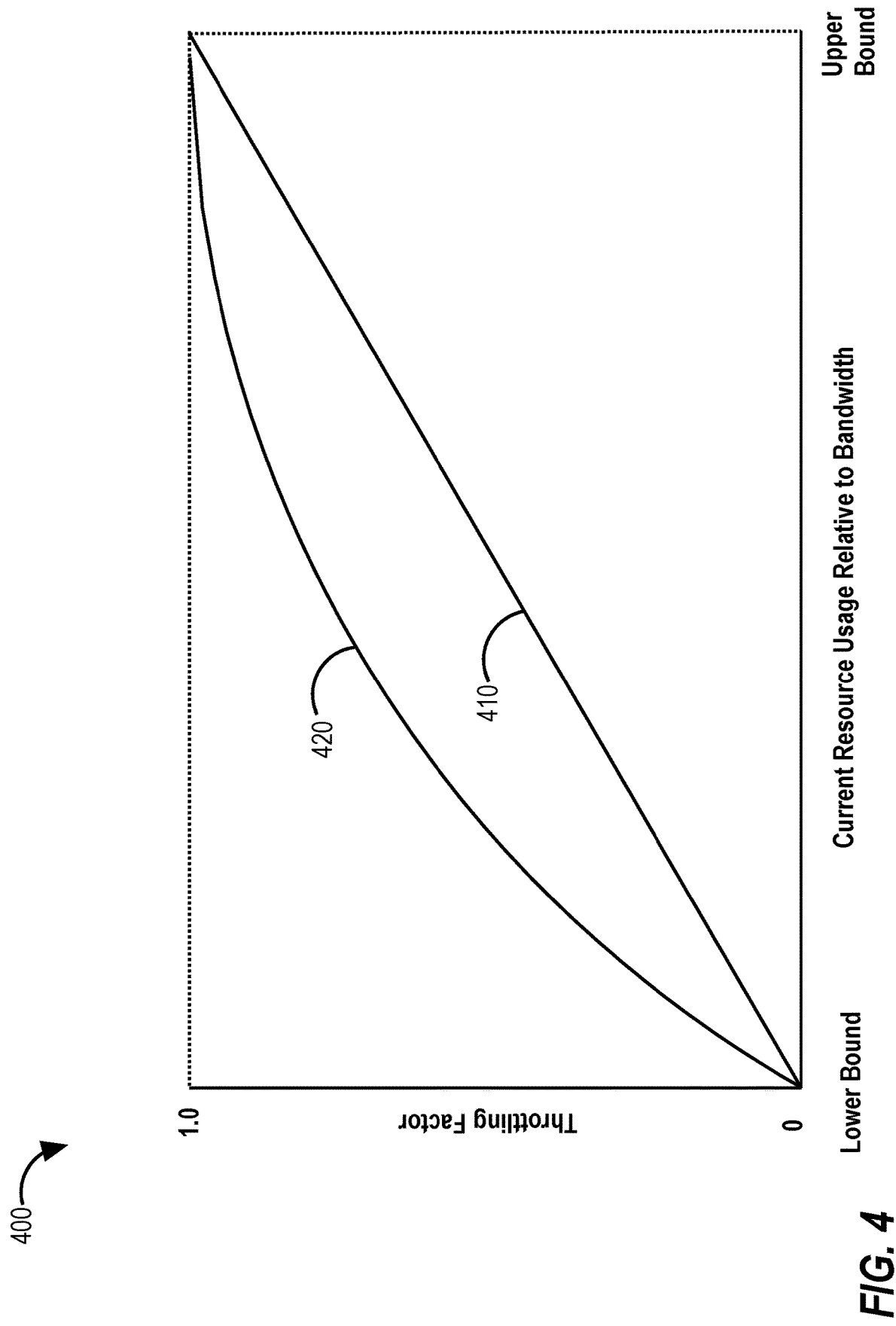
FIG. 4 is a chart that depicts linear and non-linear interpolation for determining a throttling factor, in an embodiment.

FIG. 4 is a chart 400 that depicts a linear interpolation for determining a throttling factor, in an embodiment. (The information in chart 400 may be implemented in a mapping or a two-column table.) The x-axis of chart 400 corresponds to a current resource usage relative to a bandwidth. The left side (or 0 value) of the x-axis represents the lower bound of an associated bandwidth. The right side of the x-axis represents the upper bound of the associated bandwidth. The y-axis of chart 400 corresponds a throttling factor and ranges from 0 (or no) throttling to maximum throttling. Line 410 illustrates linear interpolation where, given an increase in current resource usage, there is an equal corresponding increase in throttling factor.

In a related embodiment, non-linear interpolation is used to determine a throttling factor. Chart 400 includes curve 420 that illustrates an example of non-linear interpolation where, given an increase in current resource usage near the lower bound of a bandwidth, there is a greater corresponding increase in throttling factor. In other words, the slope of curve 420 is greater than the slope of line 410 (which has a constant slope) near the lower bound of the bandwidth. But, in this example, given an increase in current resource usage near the upper bound of the bandwidth, there is a lesser corresponding increase in throttling factor. If a curve like curve 420 is followed in determining a throttling factor, then that may indicate a desire to err on the side of greater throttling.

Bid Adjustment

In an embodiment, a bid value is adjusted based on a difference between a current resource usage and a target resource usage. For example, if the current resource usage is greater than the target resource usage, then the bid value decreases. Conversely, if the current resource usage is less than the target resource usage, then the bid value increases. Unlike throttling which affects the probability of participating in a content item selection event, bid adjustment affects the probability of winning a content item selection event.

In an embodiment, a bid value may only increase and/or decrease based on current policy, which may be a policy established by content delivery exchange 120 or by content providers. Thus, different content delivery campaigns may be associated with different policies. For example, one content delivery campaign may not allow a bid to increase while another content delivery campaign may not allow a bid to change at all.

In a related embodiment, if bid adjustment is allowed for a content delivery campaign, then the bid is adjusted before a throttling factor is applied. For example, if a current resource usage of a content delivery campaign is greater than a target resource usage of the content delivery campaign, then a bid value of the content delivery campaign is decreased. In subsequent content item selection events, a throttling factor is calculated and applied to determine whether the content delivery campaign will participate in those content item selection events.

Bid adjustment may occur until the bid value reaches a pre-defined maximum bid or minimum bid. For example, a content delivery campaign begins with a bid value of $3 and is associated with a maximum bid of $5 and a minimum bid of $2. The greater the current resource usage is relative to the target resource usage, the lower the bid until it reaches the minimum bid. Conversely, the lower the current resource usage is relative to the target resource usage, the higher the bid until it reaches the maximum bid. Alternatively, bid adjustment is applied until the current resource usage is outside of a bandwidth, which may be the same or different than the bandwidth described herein. For example, one relatively narrow bandwidth (e.g., +/−5%) is used for bid adjustment and another relatively wider bandwidth (e.g., +/−15%) is used for probabilistic throttling.

In a related embodiment, bid adjustment is the sole mechanism for controlling/pacing resource usage. In other words, in this embodiment, a probability throttling factor is not calculated and used to determine whether the corresponding content delivery campaign will participate in a current (and/or future) content item selection event.

In an embodiment, an amount to adjust a bid is determined based on a history of content item selection events and the winning bid values (or minimum winning bid values). A minimum winning bid is a bid value, in a content item selection event, that is the highest of all bids that were not selected (i.e., for presenting the corresponding content items). The history may be reflected as a percentage of previous content item selection events in which a content delivery campaign (or an associated content item) was selected given a specific bid value (e.g., $3.15) or a range of bid values (e.g., $3.00-$3.25). For example, a bid value of $2.60 would have won 35% of a set of content item selection events, whereas a bid value of $3.50 would have won 65% of the set of content item selection events (including the 35% that would have been won based on $2.60). Generally, the higher the bid, the more likely the bid will win (or be one of the winners of) a content item selection event. Conversely, the lower the bid, the less likely the bid will win (or be selected as a result of) a content item selection event.

In an embodiment, different content delivery campaigns are associated with different bid distribution-win probabilities. Thus, the history of content item selection events may be limited to content item selection events in which the corresponding content delivery campaign participated. If there is little to no history (e.g., because the content delivery campaign is new), then content item selection events of similar campaigns (e.g., in terms of the target audience, the targeting criteria, a target industry, a language, and/or a geography) may be analyzed to determine a distribution of bid values and their respective probabilities.

Offsite Vs. Onsite

In an embodiment, where a content item selection event is conducted has an impact on how resource usage is controlled. Content delivery exchange 120 (considered "onsite") may conduct one set of content item selection events and a third-party exchange (considered "offsite") may conduct another set of content item selection events (to which content delivery exchange 120 may bid on behalf of one or more content providers). Some content delivery campaigns may participate in both sets of content item selection events.

As an example of a difference in controlling resource usage, if a content item selection event occurs onsite, then a bandwidth may have an average width (if the bandwidth varies at all) of 20% while if a content item selection event occurs offsite, then the bandwidth may have an average width of 10%, indicating that there may be more volatility in resource usage events that occur offsite, such as impression events and click events. Events that occur offsite may take longer to detect since one or more third parties are relied on to report such events. In contrast, onsite events may be detected in near real-time.

As another example, the bandwidth associated with a content delivery campaign is the same regardless of whether a content item selection event occurs onsite or offsite. However, the offset may be different. For example, for onsite content item selection events, the offset is 5% below the target resource usage at time T. For offsite content item selection events, the offset is 10% below the target resource usage at time T.

In an embodiment, different third-party exchanges are associated with different bandwidths, different offsets, and or different interpolations. The size of such bandwidths and offsets and shape of such interpolations may be based on how quickly usage events are reported to content delivery exchange 120. For example, relatively faster reporting third-party exchanges may be associated with generally smaller (or narrower) bandwidths and offsets and flatter interpolations (i.e., whose slope is constant or near constant) than relatively slower reporting third-party exchanges.

Anticipated Resource Usage

In process 200 described previously, one of the factors considered in determining whether to prevent, allow, or throttle a content delivery campaign is current resource usage. However, a problem arises when relying on current resource usage, especially in CPC campaigns where a content provider is charged per user selection (e.g., a "click" of a content item). When a content item is served by content delivery exchange 120 and displayed on a client device, a user of the client device might select the content item after a few seconds, a few minutes, a few hours, or, in some rare occasions, a few days. For example, a user, operating a client device, requests a web page and a content item is displayed thereon. The user then decides to watch a movie on another device. This impression of the content item is considered "outstanding" in that the content item has been presented, but not yet selected. After the movie is over, the user picks up and the client device, scans the web page, and selects the content item. It is possible for there to be many such "outstanding impressions", each of which might be user selected.

These outstanding impressions of a content item and their respective selection likelihoods reflect an "anticipated resource usage" of the content item (or corresponding content delivery campaign). Thus, a "true" current resource usage of a content delivery campaign is based not only on actual resource usage of the content delivery campaign (i.e., what content delivery exchange 120 has received in the form of click data items for the content delivery campaign), but also on anticipated resource usage of the content delivery campaign, which is based on one or more impressions or servings of one or more content items of the content delivery campaign.

Thus, in an embodiment, anticipated resource usage of a content delivery campaign is determined and used in determining whether to throttle the content delivery campaign. Anticipated resource usage is determined based on a number of events associated with one or more content items of a content delivery campaign, an estimated resource reduction (or "cost") of each of the events associated with the one or more content items, and a decay factor. In the following description, the type of event is an impression event, although subsequent description refers to serving events.

Estimated cost per impression (ECPI) may be determined or calculated in one of a number of ways. For example, an ECPI of an impression is based on combining (e.g., multiplying) (1) a cost-per-click (CPC) of the corresponding content item and (2) a click-through rate (CTR) of the corresponding content item. The CTR of a content item may be a predicted CTR (pCTR) that is based on attributes of a user or member that initiated the content request that triggers the content item selection event. A pCTR may be calculated using a machine-learned model that is trained on user features and campaign features. Thus, because each impression of a content item may be to a different end-user, each impression of the content item may be associated with a different pCTR and, thus, a different EPCI. In fact, two impressions of a content item to the same end-user may be associated with a different pCTR because the end-user's features (that are used to generate a pCTR) may change over time. Alternatively, the CTR of a content item is an actual CTR that is calculated based on user interaction data and which may be the same for all (or many) impressions of the content item, unless the actual CTR is updated from time to time during the pendency of the corresponding content delivery campaign.

In many cases, the CPC of a content delivery campaign is fixed for the duration of the campaign; however, a content provider may change the CPC of a campaign during the pendency of the campaign. Therefore, when calculating the ECPI of an impression, the CPC component may change. The following is an example formula that may be used to calculate an anticipated resource usage of a content delivery campaign:

$$AS(t) = \sum_i ecpi^{(i)} \times e^{-\lambda(t-t(i))}$$

where AS(t) is anticipated resource usage at time t, i is the ith impression, ecpi$^{(i)}$ is the ECPI of an impression i, t(i) is the time of impression i, λ is a decay factor, and λ>0. The decay factor is applied to each ECPI of an impression. As the time since an impression occurred in the past increases, the second term (or "decay term") in the formula above (i.e., $e^{-\lambda(t-t(i))}$) decreases, which causes the value of the product of the EPCI and decay term to decrease. Thus, if an impression occurred a week ago, the impact that that impression has on anticipated resource usage (AS) may be negligible.

However, if the decay factor λ is very large, then each term in AS will decay very fast, which means the influence window of each impression will be smaller and could lead to over delivery of content item(s) of the corresponding content delivery campaign. Conversely, if the decay factor λ is very small, then each term in AS will decay very slowly, which means the influence window of each impression will be greater and could lead to under delivery of content item(s) of the corresponding content delivery campaign. Thus, the decay factor may be manually tuned to control over delivery and under delivery. Alternatively, the decay factor may be tuned automatically based on feedback with respect to past or current content delivery campaigns. For example, if a first threshold percentage of content delivery campaigns are experiencing over delivery, then the decay factor may be decreased. If a second threshold percentage of content delivery campaigns are experiencing under delivery, then the decay factor may be increased.

Updating Anticipated Resource Usage

Updating anticipated resource usage of a content delivery campaign may be performed in one or more ways. For example, each time an impression data item is received that pertains to a particular content delivery campaign, the above formula for calculating AS may be used, thus summing all the products of each ECPI and their corresponding decay term. However, this naïve approach would require many computing resources and may take too long in order to determine whether to throttle the corresponding campaign.

As another example, whenever an anticipated resource usage is calculated for a particular content delivery campaign, that value is stored and used later to calculate a subsequent anticipated resource usage. A decay term is applied to the most recent anticipated resource usage and then an ecpi associated with a most recent impression is added. An example formula for updating an anticipated resource usage in response to receiving an impression for a content delivery campaign is as follows:

$$AS(t)=AS(t')\times e^{-\lambda(t-t')}+ecpi$$

$$t'=t$$

where t is the current time (or the time associated with the most recent impression, which may have been received milliseconds or a few seconds prior to the current time), t' is the last time the anticipated resource usage was updated, AS(t') is the value of the most recently determined anticipated resource usage, and ecpi is the ECPI of the most recent impression. As noted above, t' is assigned to t.

In some situations, impression events may be received out of order due to network latency or other reasons. To address this issue, the timestamp of the last time the anticipated resource usage is updated, called t'. Each time an impression event is received with a timestamp t, the corresponding anticipated resource usage is updated, along with t'. If t>t', then the above formula may be used to update the anticipated resource usage. However, if t<=t', then t' is not updated and a discounted ECPI value of the impression event is added to the anticipated resource usage to update the anticipated resource usage. An example formula of such updating is as follows:

$$AS(t')=AS(t')+ecpi\times e^{-\lambda(t'-t)}$$

In an embodiment, an anticipated resource usage for a content delivery campaign is updated whenever an impression event is detected. Alternatively, an anticipated resource usage for a content delivery campaign is updated on a periodic basis, such as after every one hundred impression events or every minute, regardless of the number of impression events that have been detected. In this way, computing resources can be conserved. Such a delay in updating an anticipated resource usage may be acceptable and can be accounted for by increasing the decay factor.

Different Decay Factors

In an embodiment, different impression events are associated with different decay factors. Different factors (such as campaign type, delivery channel, time of day, day of week, and position within web content (e.g., a web page)) may be associated with different impression-click delays. For example, different campaign types may be associated with different decay factors. As another example, a mobile delivery channel may be associated with a higher decay factor than a desktop delivery channel. As another example, impression events that occur on the weekend may have a lower decay factor than impression events that occur on a weekday. As another example, content items that are presented in a news feed may have a higher decay factor than content items that are presented on the right side of a web page. Thus, the position of content items within web content may affect the overall delay between impressions and clicks of those content items.

Thus, not only might different content delivery campaigns be associated with different decay factors, different impression events of a single content delivery campaign may be associated with different decay factors.

A decay factor may be associated with a combination of factors. For example, one decay factor may be established for a first campaign type on a particular delivery channel (e.g., mobile), while another decay factor may be established for a second campaign type on the particular delivery channel.

Handling Click Events

In an embodiment, when a click event associated with a particular content delivery campaign occurs, the corresponding ECPI term is deducted from the anticipated resource usage of that particular campaign since the anticipated resource usage of the corresponding impression because actual resource usage. However, because the ECPI term is relatively small compared to CPC (i.e., because the CTR of the content item is relatively small), the click event can be ignored.

Serving-Based Technique

Instead of using the above approach to determining anticipated resource usage of a content delivery campaign (referred to herein as the "impression-based technique") where impression events are considered, a serving-based technique is used to determine anticipated resource usage. A serving-based technique does not rely on impression events to trigger or calculate anticipated resource usage. Instead, an estimated cost per serving (ECPS) is determined for each content item that is selected as part of a content item selection event. ECPS replaces ECPI, but is based on ECPI and another factor, referred to herein as "impression probability." For example, ECPS=ECPI*impression probability. Impression probability the probability of having an impression after a content item is served (e.g., by content delivery exchange 120). Even though a content item is selected as part of a content item selection event, that content item might not be presented through (e.g., displayed on) a client device. The following is an example formula to determine anticipated resource usage using a serving-based technique:

$$AS(t) = \sum_i ecps^{(i)} \times e^{-\lambda(t-t(i))}$$

An example formula for updating an anticipated resource usage in response to a single serving event is as follows:

$$AS(t) = AS(t') \times e^{-\lambda(t-t')} + ecpi$$

Similar to impression-click delay, the impression probability (which is used to calculate ECPS) may vary depending on different factors, such as delivery channel, campaign type, position within web content, time of day, and day of week. Thus, not only might different content delivery campaigns be associated with different impression probabilities, different serving events of a single content delivery campaign may be associated with different impression probabilities.

In an embodiment, an anticipated resource usage for a content delivery campaign is updated whenever a serving event is detected. Alternatively, an anticipated resource usage for a content delivery campaign is updated on a periodic basis, such as after every one hundred serving events or every minute, regardless of the number of serving events that have been detected.

A serving-based technique has a number of advantages over the impression-based technique. For example, a serving-based technique can predict anticipated resource usage immediately after serving a content item, whereas an impression-based technique must wait until an impression occurs, which may be a few seconds after serving. As another example, in one implementation, a serving event that is generated in response to completing a content item selection event includes ECPI information (and, optionally, other information, such as position and delivery channel information), whereas an impression event might not include such information. In order to obtain ECPI information based on an impression event, the impression event may need to be joined with selection events to identify the corresponding serving event, which may contain the necessary information. As another example, there may be duplicated impression events that are generated when a user scrolls down and up through web content, which might result in generating multiple impression events for the same content item. Updating an anticipated resource usage based on many duplicated impression events may result in too high of a calculation of anticipated resource usage. As another example, in one impression-based technique implementation, in order to determine an anticipated resource usage for a content delivery campaign, multiple types of events may need to be "listened" (e.g., subscribed) for, such as impression events from on-network content item selection events (i.e., conducted by content delivery exchange 120) and impression events from off-network content item selection events (conducted by a different party/entity than the party/entity that owns or operates content delivery exchange 120). In contrast, in a serving-based technique implementation, only one type of event is considered.

An advantage of an impression-based technique over a serving-based technique is that the latter will have slightly more error (though possibly acceptable) in the ECPS calculation due to the impression probability, which may change from time to time and be very different from delivery channel to delivery channel, from position to position, and from campaign type to campaign type. Thus, at least with regards to this aspect, there is more complexity in the serving-based technique.

Example Process

Figure 5:
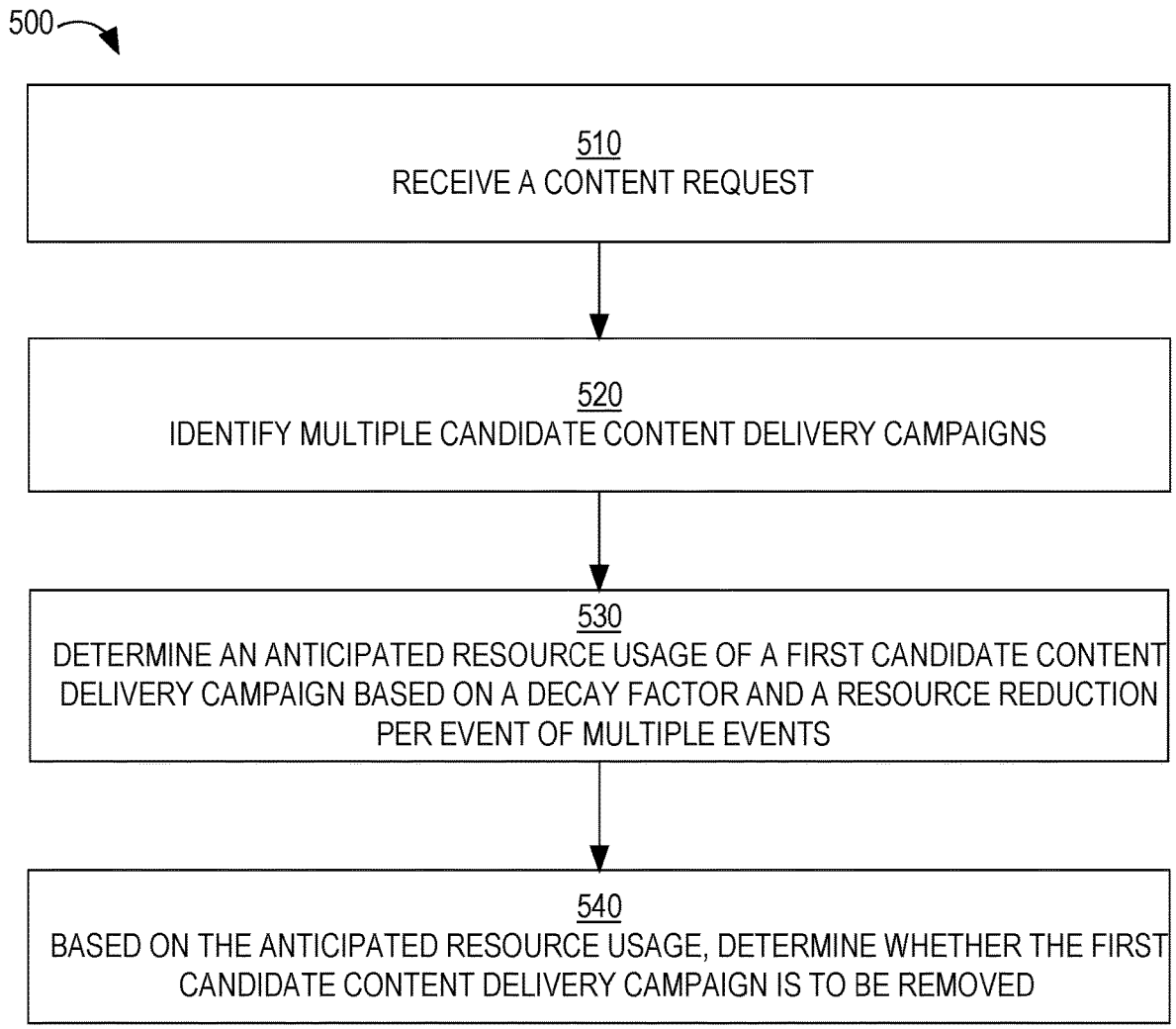
FIG. 5 is a flow diagram that depicts a process for determining anticipated resource usage, in an embodiment.

FIG. 5 is a flow diagram that depicts an example process 500 for determining an anticipated resource usage of a content delivery campaign, in an embodiment. Process 500 may be implemented by content delivery exchange 120.

At block 510, a content request is received.

At block 520, a content item selection event is initiated where multiple candidate content delivery campaigns are identified.

At block 530, for a first candidate content delivery campaign, an anticipated resource usage of a resource that is associated with the first candidate content delivery campaign is determined. Block 530 involves determining the anticipated resource usage based on (1) an effective resource reduction per event of each event in a set of detected events of a content item of the first candidate content delivery campaign and (2) a decay factor.

At block 540, based on the anticipated resource usage, it is determined whether the first candidate content delivery campaign is to be removed from the set of candidate content delivery campaigns.

Blocks 530-540 may be repeated for each candidate content delivery campaign identified in block 520.

While process 500 is performed in response to a content request (e.g., from client device 142) that initiates a content item selection event, block 530 may be performed offline. Thus, block 530 might not be performed in response to a content request but in anticipation of a content request. For example, anticipated resource usage determination for each of multiple content delivery campaigns may occur every ten minutes regardless of whether a content request is received that triggers identification of any of the content delivery campaigns during a content item selection event.

Example System Architecture

Figure 6:
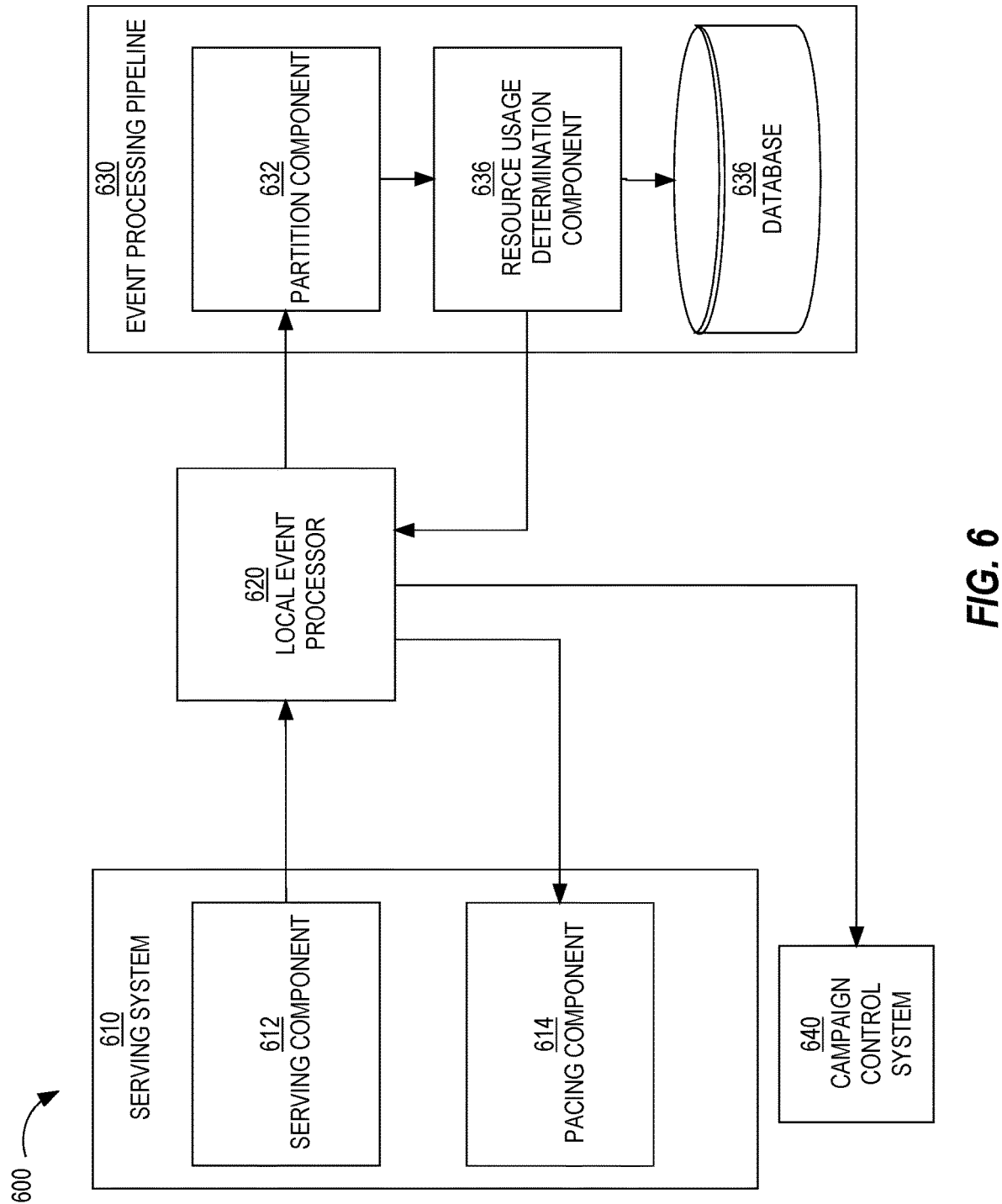
FIG. 6 is a block diagram that depicts a process for controlling resource usage associated with a particular content delivery campaign, in an embodiment.

FIG. 6 is a block diagram that depicts an example system 600 for processing events that are used to determine anticipated resource usages for multiple content delivery campaigns, in an embodiment. System 600 includes a serving system 610, a local event processor 620, an event processing pipeline 630, and campaign control system 640. System 600 may be part of content delivery exchange 120.

Serving system 610 includes a serving component 612 and a pacing component 614. Serving system 610 conducts content item selection events and serving component 612 serves content items to client devices (e.g., client devices 142-146) over a network. For each content item that is served to a client device, serving component 612 generates a serving event that indicates or specifies one or more data items, such as a campaign identifier that uniquely identifies the campaign to which the content item belongs, a content item identifier that uniquely identifies (e.g., with the campaign identifier) the content item, a timestamp indicating a date and/or time of the serving, an ECPI of the content item, a position of the content item (e.g., right rail, top of page, within a feed), delivery channel (e.g., mobile, desktop, tablet), and campaign type.

Pacing component 614 receives events from local event processor 620 and uses data within the events to determine whether to throttle content delivery campaigns that are identified as candidates in response to receiving a content request. For example, an event from local event processor 620 may indicate an updated anticipated resource usage (of a particular content delivery campaign) that pacing component 614 uses along with a target resource usage associated with the particular campaign to determine whether to throttle the particular campaign.

Local event processor 620 comprises one or more computing devices that receive events, such as serving events generated by serving component 612, and forwards events (e.g., updated anticipated usage events) generated by other components.

Event processing pipeline 630 comprises a partition component 632, a resource usage determination component 634, and a database 636. Partition component 632 receives a serving event from local event processor 620. In response, partition component 632 adds a partition identifier to the serving event. The partition identifier may be based on the content delivery campaign associated with the serving event. The partition identifier may be determined based on a campaign ID-partition mapping. For example, different sets of content delivery campaigns are associated with different partition identifiers. For example, if there are one hundred thousand campaigns, and ten downstream consumers of serving events, then each campaign is mapped to one of ten partitions, each downstream consumer being mapped to a partition.

After partition component 632 adds a partition identifier to each serving event, resource usage determination component 634 receives (directly or indirectly) the modified serving events according to the assigned partitions. Thus, there may be a different resource usage determination component 634 for each partition. For example, a first resource usage determination component receives serving events associated with a first partition and a second resource usage determination component receives serving events associated with a second partition.

Resource usage determination component 634 calculates an anticipated resource usage for a content delivery campaign and/or updates an anticipated resource target of a content delivery campaign. Resource usage determination component 634 may wait to perform a calculation or update based on the lapse of a particular amount of time (e.g., every minute or ninety seconds) or every threshold number of events (e.g., one hundred events).

After calculating or updating an anticipated resource usage for a content delivery campaign, resource usage determination component 634 generates an event that specifies the new anticipated resource usage and the corresponding content delivery campaign. The event may also indicate a topic to which pacing component 614 subscribes. Resource usage determination component 634 sends this event to local event processor 620, after which pacing component 614 receives the event from local event processor 620.

Resource usage determination component 634 may store, in database 636, a newly calculated anticipated resource usage for a content delivery campaign. Such storage is useful in case one or more computing devices storing the updated data fail or an entire data center goes offline. Anticipated resource usage data may be retrieved from database 636 in such scenarios.

Campaign control system 640 receives (e.g., "subscribes to") events from local event processor 620 and uses data within the events to determine whether to stop corresponding content delivery campaigns. If a resource limit for a particular content delivery campaign is reached (e.g., actual resource usage+anticipated resource usage>resource limit), then campaign control system 640 generates an event that indicates resource exhaustion for the particular content delivery campaign. Such an event is used by content delivery exchange 120 to prevent the particular content delivery campaign from being considered as a candidate in future content item selection events, at least while the associated resources are exhausted.

In an embodiment, a group of content delivery campaigns is associated with a resource limit that may be independent of any resource limit associated with individual campaigns with the group. Thus, if a particular resource limit is reached for a particular group of campaigns, then all campaigns within the particular group are stopped, regardless of whether any individual campaigns within the particular group have remaining resources. Additionally or alternatively, an account is associated with a resource limit that may be independent of any resource limit associated with individual campaigns or groups of campaigns under the account. A single account may have multiple groups of campaigns. Thus, if a particular resource limit is reached for a particular account, then all the campaigns under that account are stopped, regardless of whether any individual campaigns under the particular account have remaining resources.

Benefits

Embodiments provide one or more of the following benefits over current approaches for controlling resource consumption in a computing environment. One benefit is that over delivery can be avoided or at least significantly reduced for many content delivery campaigns. This is turn will allow content delivery exchange 120 to select other content delivery campaigns that are associated with more resources than the previously over-delivered content delivery campaigns.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 7:
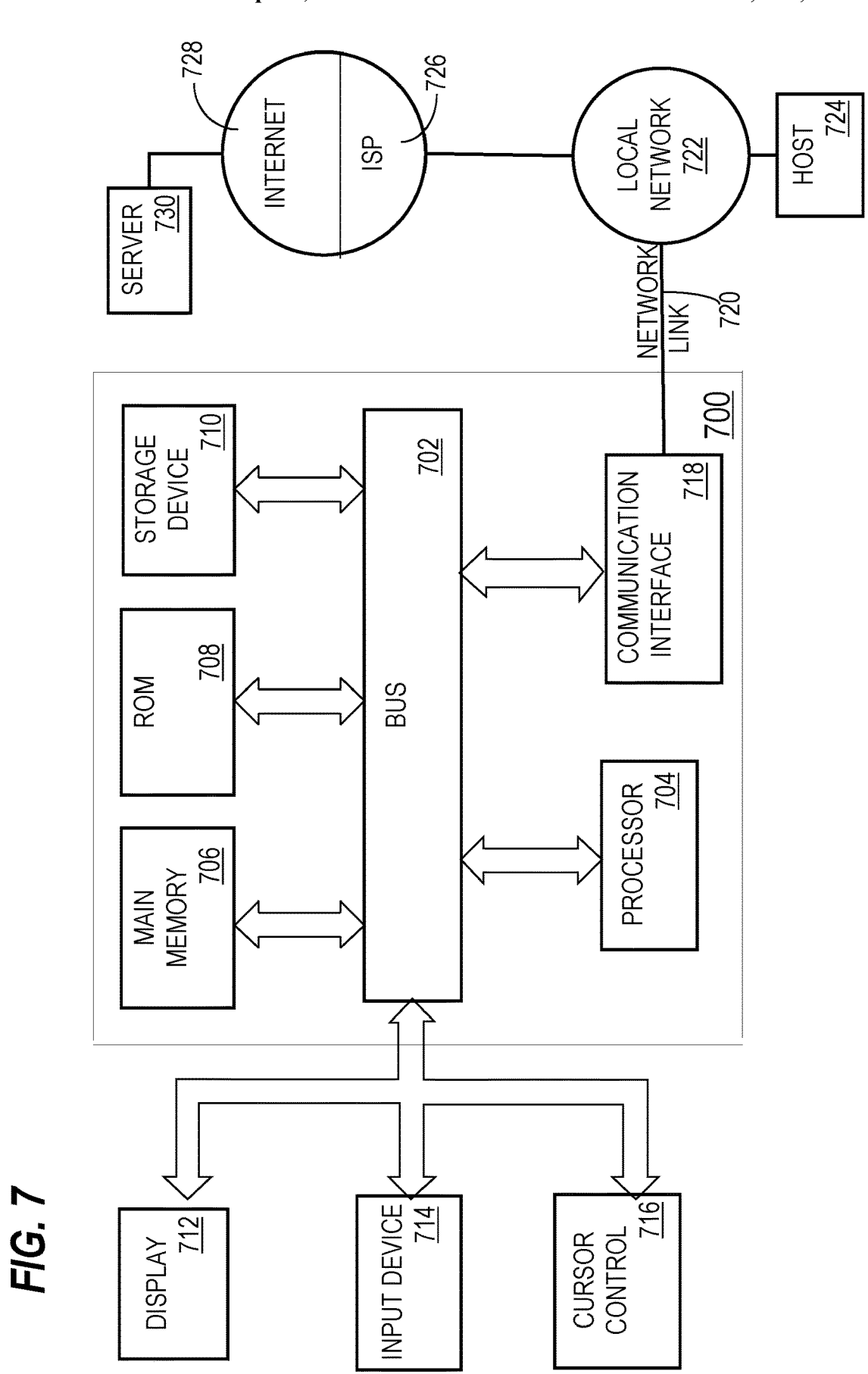
FIG. 7 is a block diagram that illustrates a computer system upon which an embodiment of the invention may be implemented.

For example, FIG. 7 is a block diagram that illustrates a computer system 700 upon which an embodiment of the invention may be implemented. Computer system 700 includes a bus 702 or other communication mechanism for communicating information, and a hardware processor 704 coupled with bus 702 for processing information. Hardware processor 704 may be, for example, a general purpose microprocessor.

Computer system 700 also includes a main memory 706, such as a random access memory (RAM) or other dynamic storage device, coupled to bus 702 for storing information and instructions to be executed by processor 704. Main memory 706 also may be used for storing temporary variables or other intermediate information during execution of instructions to be executed by processor 704. Such instructions, when stored in non-transitory storage media accessible to processor 704, render computer system 700 into a special-purpose machine that is customized to perform the operations specified in the instructions.

Computer system 700 further includes a read only memory (ROM) 708 or other static storage device coupled to bus 702 for storing static information and instructions for processor 704. A storage device 710, such as a magnetic disk, optical disk, or solid-state drive is provided and coupled to bus 702 for storing information and instructions.

Computer system 700 may be coupled via bus 702 to a display 712, such as a cathode ray tube (CRT), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

Computer system 700 may implement the techniques described herein using customized hard-wired logic, one or more ASICs or FPGAs, firmware and/or program logic which in combination with the computer system causes or programs computer system 700 to be a special-purpose machine. According to one embodiment, the techniques herein are performed by computer system 700 in response to processor 704 executing one or more sequences of one or more instructions contained in main memory 706. Such instructions may be read into main memory 706 from another storage medium, such as storage device 710. Execution of the sequences of instructions contained in main memory 706 causes processor 704 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 710. Volatile media includes dynamic memory, such as main memory 706. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 702. Transmission media can also take the form of acoustic or light waves, such as those generated during radio-wave and infra-red data communications.

Various forms of media may be involved in carrying one or more sequences of one or more instructions to processor 704 for execution. For example, the instructions may initially be carried on a magnetic disk or solid-state drive of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card, cable modem, satellite modem, or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the world wide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are example forms of transmission media.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718.

The received code may be executed by processor 704 as it is received, and/or stored in storage device 710, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. One or more storage media storing instructions which, when executed by one or more processors, cause:
   in response to receiving a content request, identifying a set of candidate content delivery campaigns;
   for a first candidate content delivery campaign in the set of candidate content delivery campaigns, determining an anticipated resource usage of a resource that is associated with the first candidate content delivery campaign,
   wherein determining the anticipated resource usage is based on (1) a resource reduction per event of each event in a set of detected events of a content item of the first candidate content delivery campaign and (2) a decay factor;
   wherein for a first event in the set of detected events, the anticipated resource usage is based on a first decay term that is based on the decay factor;
   wherein for a second event in the set of detected events, the anticipated resource usage is based on a second decay term that is different than the first decay term and that is based on the decay factor; and
   based on the anticipated resource usage, determining whether to remove the first candidate content delivery campaign from the set of candidate content delivery campaigns.

2. The one or more storage media of claim 1, wherein determining whether to remove the first candidate content delivery campaign comprises:
   determining, for the first candidate content delivery campaign, a target resource usage for a particular point in time;
   determining, for the first candidate content delivery campaign, a current resource usage for the particular point in time;
   determining, for the first candidate content delivery campaign an estimated true current resource usage based on the current resource usage and the anticipated resource usage;
   determining a bandwidth associated with the target resource usage at the particular point in time;
   based on a difference between the estimated true current resource usage and one or more boundaries of the bandwidth, calculating a throttling factor; and
   based on the throttling factor, determining a probability of the first candidate content delivery campaign participating in a content item selection event that was initiated by the content request.

3. The one or more storage media of claim 1, wherein each event in the set of detected events corresponds to a different impression of the content item of the first candidate content delivery campaign.

4. The one or more storage media of claim 1, wherein each event in the set of detected events corresponds to a different serving of the content item of the first candidate content delivery campaign.

5. The one or more storage media of claim 4, wherein, for each event in the set of detected events, the resource reduction of said each event is based on a probability of impression of the content item that corresponds to said each event.

6. The one or more storage media of claim 5, wherein:
   for a third event in the set of detected events of the first candidate content delivery campaign, the resource reduction of the third event is based on a first probability of impression; and
   for a fourth event in a second set of detected events of a second of candidate content delivery campaign that is different than the first candidate content delivery campaign, the resource reduction of the fourth event is based on a second probability of impression that is different than the first probability of impression.

7. The one or more storage media of claim 5, wherein:
   for a third event in the set of detected events of the first candidate content delivery campaign, the resource reduction of the third event is based on a first probability of impression; and
   for a fourth event in the set of detected events, the resource reduction of the fourth event is based on a second probability of impression that is different than the first probability of impression.

8. The one or more storage media of claim 1, wherein the decay factor is a first decay factor, wherein the instructions, when executed by the one or more processors, further cause:
   for a second candidate content delivery campaign that is different than the first candidate content delivery campaign, determining a second anticipated resource usage of a second resource that is associated with the second candidate content delivery campaign;
   wherein determining the second anticipated resource usage is based on a second decay factor that is different than the first decay factor.

9. The one or more storage media, of claim 1, wherein the instructions, when executed by the one or more processors, further cause, after determining the anticipated resource usage:
   receiving a new event; and
   after receiving the new event:
      determining a second resource reduction that is associated with the new event;
      generating an updated anticipated resource usage based on the anticipated resource usage, a second decay factor, and the second resource reduction.

10. The one or more storage media of claim 1, wherein the instructions, when executed by the one or more processors, further cause, after determining the anticipated resource usage:
   receiving a plurality of new events;
   refraining from updating the anticipated resource usage until after the plurality of new events are received; and
   after receiving the plurality of new events:
      for each event in the plurality of new events, determining a second resource reduction that is associated with said each event;
      updating the anticipated resource usage based on the anticipated resource usage, a second decay factor, and the second resource reduction that is associated with each event in the plurality of new events.

11. A method comprising:
   in response to receiving a content request, identifying a set of candidate content delivery campaigns;
   for a first candidate content delivery campaign in the set of candidate content delivery campaigns, determining an anticipated resource usage of a resource that is associated with the first candidate content delivery campaign, wherein determining the anticipated resource usage is based on (1) a resource reduction per event of each event in a plurality of detected events of a content item of the first candidate content delivery campaign and (2) a decay factor that represents a likelihood that users associated with the plurality of detected events will perform one or more actions in response to being presented with the content item; and based on the anticipated resource usage, determining whether to remove the first candidate content delivery campaign from the set of candidate content delivery campaigns;

wherein the method is performed by one or more computing devices.

12. The method of claim 11, wherein determining whether to remove the first candidate content delivery campaign comprises:

determining, for the first candidate content delivery campaign, a target resource usage for a particular point in time;

determining, for the first candidate content delivery campaign, a current resource usage for the particular point in time;

determining, for the first candidate content delivery campaign an estimated true current resource usage based on the current resource usage and the anticipated resource usage;

determining a bandwidth associated with the target resource usage at the particular point in time;

based on a difference between the estimated true current resource usage and one or more boundaries of the bandwidth, calculating a throttling factor; and based on the throttling factor, determining a probability of the first candidate content delivery campaign participating in a content item selection event that was initiated by the content request.

13. The method of claim 11, wherein each event in the plurality of detected events corresponds to a different impression of the content item of the first candidate content delivery campaign.

14. The method of claim 11, wherein each event in the plurality of detected events corresponds to a different serving of the content item of the first candidate content delivery campaign.

15. The method of claim 14, wherein, for each event in the plurality of detected events, the resource reduction of said each event is based on a probability of impression of the content item that corresponds to said each event.

16. The method of claim 15, wherein:

for a first event in the plurality of detected events of the first candidate content delivery campaign, the resource reduction of the first event is based on a first probability of impression; and for a second event in a second plurality of detected events of a second of candidate content delivery campaign that is different than the first candidate content delivery campaign, the resource reduction of the second event is based on a second probability of impression that is different than the first probability of impression.

17. The method of claim 15, wherein:

for a first event in the plurality of detected events of the first candidate content delivery campaign, the resource reduction of the first event is based on a first probability of impression;

for a second event in the plurality of detected events, the resource reduction of the second event is based on a second probability of impression that is different than the first probability of impression.

18. The method of claim 11, wherein the decay factor is a first decay factor, further comprising:

for a second candidate content delivery campaign that is different than the first candidate content delivery campaign, determining a second anticipated resource usage of a second resource that is associated with the second candidate content delivery campaign;

wherein determining the second anticipated resource usage is based on a second decay factor that is different than the first decay factor.

19. The method of claim 11, wherein:

for a first event in the plurality of detected events, the anticipated resource usage is based on a first decay factor; and for a second event in the plurality of detected events, the anticipated resource usage is based on a second decay factor that is different than the first decay factor.

20. The one or more storage media of claim 1, wherein the first decay term is larger than the second decay term as a result of the first event occurring after the second event.

* * * * *